United States Patent [19]

Mackoway, Jr. et al.

[11] Patent Number: 4,936,429

[45] Date of Patent: Jun. 26, 1990

[54] INDEXING DEVICE FOR A VEHICULAR STEERING ASSEMBLY

[75] Inventors: John P. Mackoway, Jr., Washington; Raymond T. Schenck, Metamora, both of Ill.

[73] Assignee: Caterpillar Inc., Peoria, Ill.

[21] Appl. No.: 350,415

[22] Filed: May 11, 1989

[51] Int. Cl.⁵ .................... F16D 21/02; F16D 23/06
[52] U.S. Cl. .................................. 192/1.1; 142/4 C; 70/252
[58] Field of Search ............... 192/1.1, 4 C; 180/332, 180/333; 74/473 R, 484 R, 483 K, 485, 486, 523; 70/252

[56] References Cited

U.S. PATENT DOCUMENTS

| Re. 16,612 | 5/1927 | Hershey | 70/252 |
|---|---|---|---|
| 1,329,391 | 2/1920 | Folster | 70/252 |
| 2,032,802 | 3/1936 | Hershey | 70/252 |
| 3,386,523 | 6/1968 | Ruhl | 192/4 C |
| 3,917,021 | 11/1975 | Williams et al. | 70/252 |
| 4,373,619 | 2/1983 | Schritt et al. | 192/0.09 |
| 4,541,497 | 9/1985 | Riediger et al. | 180/6.48 |
| 4,796,736 | 1/1989 | Fee et al. | 192/4 C |
| 4,798,099 | 1/1989 | Alexander et al. | 74/473 R |

OTHER PUBLICATIONS

International Publication No. WO83/04292, published Dec. 8, 1983.

Primary Examiner—Rodney H. Bonck
Assistant Examiner—Nicholas Whitelan
Attorney, Agent, or Firm—Charles E. Lanchantin, Jr.

[57] ABSTRACT

A vehicular control mechanism is known that incorporates a steering assembly swingable about an upstanding axis in either direction from a central NEUTRAL position. Even if the transmission is not powerably driving an associated cross drive mechanism the angular displacement of the steering assembly away from NEUTRAL could cause an input to the cross drive and an undesirable movement of the vehicle under some circumstances. To obviate this, an indexing device is provided that is responsive to the movement of an actuating lever pivotally mounted on a steering assembly between BRAKE-OFF and BRAKE-ON positions. The vehicle frame defines an indexing pocket, and an elongate locking element is reciprocally mounted on the steering assembly and interconnectable with the pocket when the steering assembly is angularly positioned in NEUTRAL. The operator is quickly aware that the steering assembly is displaced from NEUTRAL when he is prevented from moving the actuating lever to the BRAKE-ON position by the indexing device. A microswitch is also activated to allow restarting of an engine starting circuit when the actuating lever is moved to the BRAKE-ON position.

8 Claims, 5 Drawing Sheets

FIG_7_

INDEXING DEVICE FOR A VEHICULAR STEERING ASSEMBLY

TECHNICAL FIELD

This invention relates generally to a control mechanism including a steering assembly for a vehicle, and more particularly to an indexing device for holding a swingable steering assembly in a neutral mode in response to movement of an actuating member to a preselected position.

BACKGROUND ART

The control mechanism disclosed in U. S. Pat. No. 4,541,497 issued to C. W. Riediger, et al. on Sept. 17, 1985, and that was constructed and arranged for steering and operating the transmission of a track-type vehicle, has been well received by the industry. In such mechanism, a tiller arm extends outwardly from a steering assembly which is swingable about an upstanding axis, and the vehicle is steered as the tiller arm is swung in either direction away from a generally centered neutral position.

As is further disclosed in U. S. Pat. No. 4,798,099 issued to G. F. Alexander, et al. on Jan. 17, 1989, the aforementioned tiller arm is preferably arranged so that an operator's left hand can twist either a directional actuating member or a juxtaposed speed actuating member about an outstanding axis of that tiller arm. In this way the vehicle operator can limitedly rotate the directional actuating member to change the direction of the vehicle or to effect neutral, and/or can rotate the speed actuating member to a selected gear ratio while simultaneously steering the vehicle by pushing or pulling the tiller arm. For example, the tiller arm can be conveniently grasped by an operator's downwardly facing left-hand palm as the vehicle is traveling forwardly and swung forwardly to steer the vehicle to the left. At the same time the vehicle can be shifted from forward to reverse by merely twisting the directional actuating member about its own axis through a relatively limited range.

U. S. Pat. No. 4,796,736 issued to D. M. Fee, et al. on Jan. 10, 1989 teaches a further advancement of the control mechanism mentioned above. Specifically, a parking brake actuating member is pivotally mounted on the steering assembly and is manually movable between BRAKE-OFF and BRAKE-0N positions. When the brake actuating member is moved to the BRAKE-ON position, a coupling apparatus associated therewith is effective to urge the directional actuating member to the neutral position. This prevents inadvertent movement of the vehicle by the transmission when the brake actuating member is subsequently placed in the BRAKE-OFF position.

As is disclosed in the aforementioned U.S. Pat. No. 4,541,497, swinging movement of the tiller arm and associated steering assembly away from neutral is mechanically translated to corresponding movement of a steering selector spool of a steering control valve. The axial displacement of that steering spool subsequently controls the flow of hydraulic fluid between an engine driven steering pump and a reversible steering motor. Even if the directional actuating member is placed in the neutral position such that the transmission is not powering the cross drive mechanism or transaxle, the steering system is still active. Particularly, the positioning of the tiller arm forwardly by the operator with the transmission neutralized could cause the vehicle to turn to the left by counterrotating the left and right tracks, and to thus make a spot turn in a counterclockwise direction about its own central vertical axis.

In order to prevent inadvertent movement of the vehicle upon restarting the engine after a shut-down, in the event that the tiller arm and steering assembly is displaced from the neutral position, it is desirable to provide a reliable indexing device for assuring the steering assembly is positively in neutral at restart. Such an indexing device should preferably be integrated with the parking brake actuating member, and should provide a feedback to the operator that the steering assembly is truly positioned in neutral. Moreover, the indexing device should preferably assure that the elements between the steering assembly and the steering selector spool are properly adjusted. And, still further, the indexing device should preferably prevent restarting of the engine if the indexing device is not engaged in the neutral mode, and be of simple and reliable construction.

The present invention is directed to one or more of the problems as set forth above.

DISCLOSURE OF THE INVENTION

In one aspect of the invention, an indexing device is provided for a vehicle having a frame brakes for inhibiting movement of the vehicle, and a control mechanism including a steering assembly and a support apparatus for mounting the steering assembly on the frame for swinging movement about an upstanding axis in either direction away from a NEUTRAL position. The indexing device includes a brake actuating member mounted on the steering assembly and being moveable between first and second positions, an elongate locking element movably connected to the steering assembly, and a connection apparatus for moving the locking element into engagement with the frame apparatus in response to movement of the brake actuating member from the first to the second position and applying the brakes solely when the steering assembly is located in NEUTRAL.

In another aspect of the invention, an indexing device is provided for holding a steering assembly in a NEUTRAL position on a vehicle having a brake, a frame, a support apparatus for mounting the steering assembly on the frame for swinging movement about an upstanding axis, and a brake actuating member mounted on the steering assembly and being limitedly rotatable thereon about a pivot axis between a BRAKE-OFF position and a BRAKE-ON position. The indexing device desirably includes a pocket defined in the frame, an elongate locking element movably mounted on the steering assembly, and a connector apparatus for interlockingly engaging the locking element with the pocket in response to movement of the brake actuating member to the BRAKE-ON position when the steering assembly is located in the NEUTRAL position.

More particularly, the instant indexing device further prevents movement of the brake actuating member or lever to the BRAKE-ON position when the steering assembly is rotated away from NEUTRAL, and depresses a switch only when the brake actuating member is in the BRAKE-ON position to allow engine start-up solely in that mode.

Other aspects and advantages of the present invention will become readily apparent upon reference to the accompanying drawings and the following description.

BEST MODE FOR CARRYING OUT THE INVENTION

Figure 1:
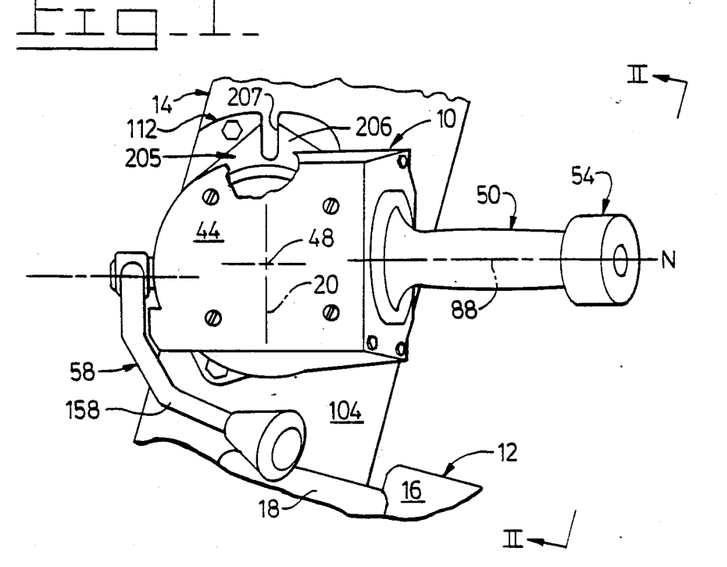
FIG. 1 is a diagrammatic, top plan view of a control mechanism for operating a vehicle including the steering assembly and indexing device of the present invention, and including a fragmentary part of an operator's station, with a portion of the steering assembly broken away to show a profiled pocket or slot associated therewith.
Figure 2:
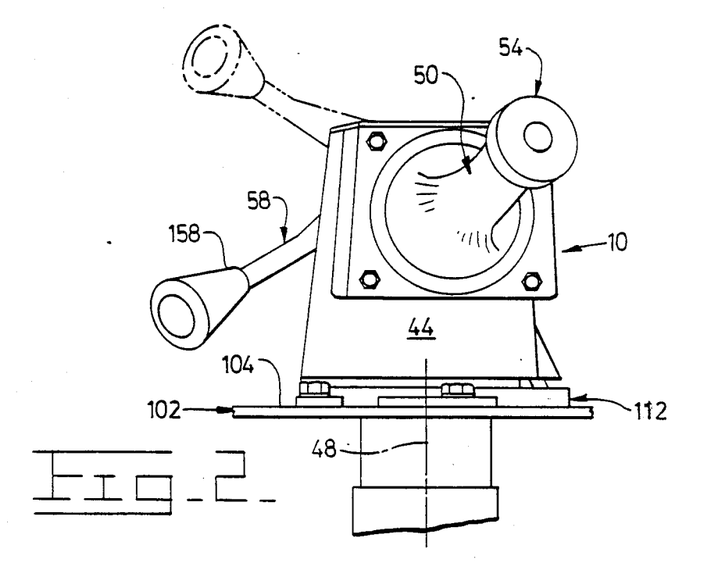
FIG. 2 is a diagrammatic, slightly oblique, right side elevational view of the control mechanism of FIG. 1 as line II—II thereof.

Referring to Figs. 1 and 2, a control mechanism 10 is shown in conjunction with a portion of an operator station 12 of a track-type vehicle 14. The operator station includes a tractor seat 16 having a left arm rest 18 as is partially illustrated, and which is obliquely arranged with respect to a vertical, longitudinal plane 20 of the vehicle.

Figure 7:
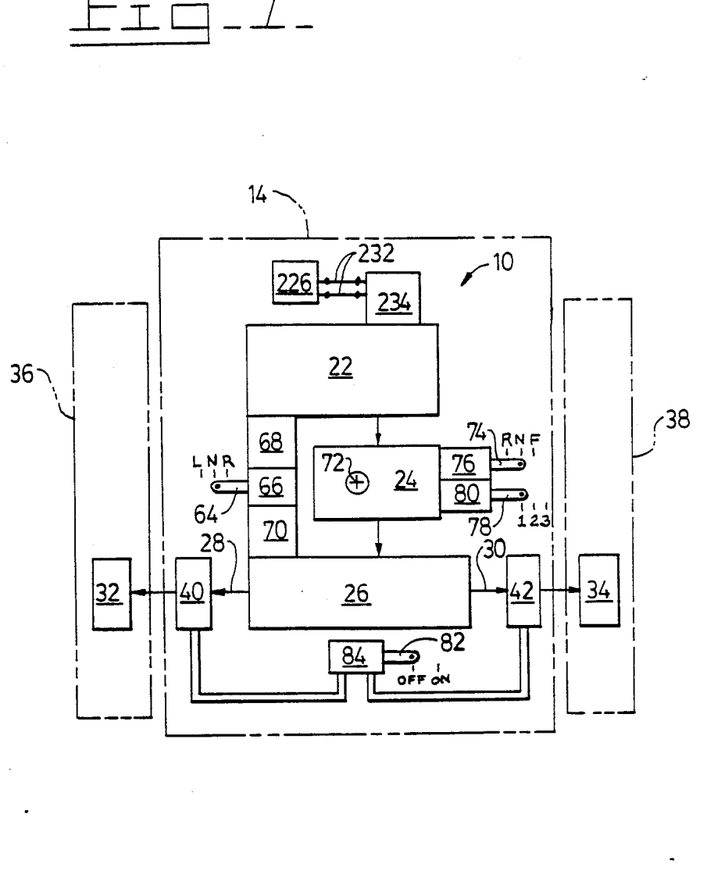
FIG. 7 is a block diagram plan view of the power train of the vehicle showing four hydraulic valves associated with the power train and operated by the control mechanism of FIGS. 1–6.

As shown in FIG. 7, the vehicle 14 includes an engine 22 drivingly connected to a power shift transmission 24 having a plurality of forward speeds and a plurality of reverse speeds. The longitudinally oriented transmission powers a cross drive mechanism 26 oriented transversely of the vehicle, which has left and right output members 28 and 30. The output members powerably rotate left and right drive wheels or sprockets 32 and 34, that respectively power left and right ground-engaging tracks or belts 36 and 38 in a well-known manner. Left and right brakes 40 and 42 are operatively associated therewith to inhibit the rotation of the individual drive wheels.

Figure 3:
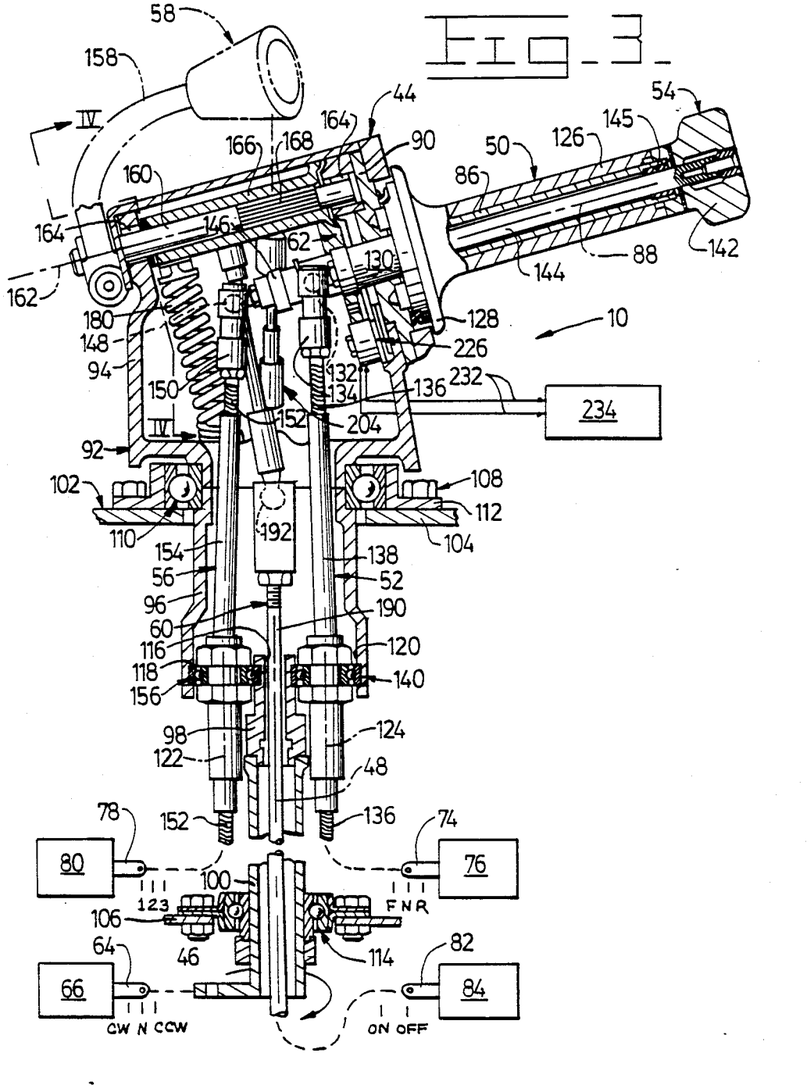
FIG. 3 is a diagrammatic, rear elevational view of the control mechanism of FIGS. 1 and 2 with portions of the housing walls broken away and certain elements shown in cross section to better illustrate details of construction thereof.

As shown best in FIG. 3, the control mechanism 10 includes: (a) a steering assembly 44 for steering the vehicle 14 by rotating an elevationally lower output lever arm 46 about a fixed upstanding axis 48; (b) a first actuator device 50 for controlling the direction of longitudinal movement of the vehicle by the generally vertical displacement of a first push-pull control or cable assembly 52; (c) a second actuator device 54 for controlling the speed range of the vehicle by the generally vertical displacement of a second push-pull control or cable assembly 56; and (d) a brake and transmission neutralizer device 58 for simultaneously restricting movement of the vehicle by the generally vertical displacement of a third push-pull control or rod assembly 60 and for urging the first actuator device 50 to a neutral position by the swinging movement of a profiled neutralizing member 62.

The steering assembly 44 includes a steering selector spool 64 which is adapted to be proportionately axially displaced in a first hydraulic control valve 66 to the counterclockwise or clockwise turn positions. As can be appreciated by reference to FIG. 7, the first hydraulic control valve 66 controls the flow of hydraulic fluid between an engine driven steering pump 68 and a reversible steering motor 70 selectively driving the cross drive mechanism 26. For example, the counterclockwise rotation of the vehicle 14 about it's own central vertical axis 72 results in a left turn when traveling forwardly.

The first actuator device 50 includes a directional selector spool 74 which is adapted to be axially displaced in a second hydraulic control valve 76 to either a FORWARD position or a REVERSE position at either side of a central NEUTRAL position as is diagrammatically shown in FIGS. 3 and 7. And, the second actuator device 54 includes a speed selector spool 78 which is axially displaced in a third hydraulic control valve 80 to obtain a preselected one of a plurality of speed range positions such as FIRST GEAR, SECOND GEAR and THIRD GEAR.

The brake and neutralizer device 58 includes a brake selector spool 82 which can be axially displaced in a fourth hydraulic control valve 84 between a BRAKE-OFF position and a BRAKE-ON position.

As shown in FIG. 3, the steering assembly 44 includes a tubular tiller arm 86 defining a central axis 88 that preferably extends upwardly at a slight angle from a horizontal plane. As is shown also in FIGS. 1 and 2, the central axis 88 extends generally toward the fixed upstanding axis of revolution 48 of the steering assembly. And when the vehicle is travelling in a straight longitudinal direction, the axis 88 is preferably transversely oriented relative to the vehicle, while the seat and the operator are preferably disposed at a slightly oblique angle, for example 15 degrees, relative to the longitudinal plane 20.

The tubular tiller arm 86 is rigidly secured to a supporting pedestal element 90 of the steering assembly 44 intermediate the ends thereof. In turn, the pedestal element is releasably secured to a swingable housing assembly 92 having an upper profiled case 94, an intermediate tubular portion 96, an intermediate adapter portion 98, and a lower tubular portion 100 arranged along the upstanding axis 48 and releasably secured together in a normal manner. A stationary frame 102 of the vehicle 14 has an upper deck 104 and a lower deck 106, and support means or a support apparatus 108 is provided for mounting the steering assembly 44 on the frame 102 for swinging movement about the upstanding axis 48. More specifically, the support apparatus 108 includes an upper ball bearing assembly 110 releasably secured to the upper deck 104 of the frame by an annular bearing retainer 112, and a lower ball bearing assembly 114.

The lower part of the intermediate tubular member 96 defines a central bore 116 on the central axis 48, and opposite and larger stepped bores 118 and 120 arranged along a diagonally opposite pair of upstanding axes 122 and 124 radially offset the same distance from the central axis 48.

Turning now to the first actuator device 50, it may be noted to include a tubular directional actuating member or first handgrip portion 126 rotatably supported on the tiller arm 86. The directional actuating member includes a stepped inner flange 128 and an inwardly extending cylindrical projection 130. This projection is rigidly secured to the inner flange at a preselected radius from the central axis 88 of the tiller arm and parallel to that axis. The projection extends through an arcuate slot through the pedestal element 90, although not shown, and has at its distal inner end a ball assembly 132 releasably secured thereto. The first push-pull cable assembly 52 includes an extendable or axially adjustable socket head 134 at its upper extremity which receives the ball assembly. The socket head 134 is connected to a depending cable 136 which is reciprocably contained in an outer shield 138. The distal end of this cable is connected to the directional selector spool 74. The shield 138 is suitably supported and guided by a first ball bearing assembly 140 generally seated in the stepped bore 120.

The second actuator device 54 includes a knob-like speed actuating member or second handgrip portion 142 releasably secured to the distal end of an elongate cylindrical shaft 144. A pair of needle bearings 145, the outer one of which is shown, rotatably support the opposite ends of the shaft within the tiller arm 86. The proximal end of the shaft 144 has a radius arm 146, as shown also in FIG. 4, with a ball assembly 148 releasably secured thereto. This ball assembly is contained within an extendable or axially adjustable socket head 150 connected to the upper end of the second push-pull cable assembly 56. A depending cable 152 is connected to the socket head 150 and is adapted to slide within an outer shield 154. A second ball bearing assembly 156 is provided to guidably support and permit relative angular movement of the shield within the housing assembly 92 about its own offset axis 122 as the housing assembly is limitedly rotated. The first ball bearing assembly 140 performs the identical function.

Figure 4:
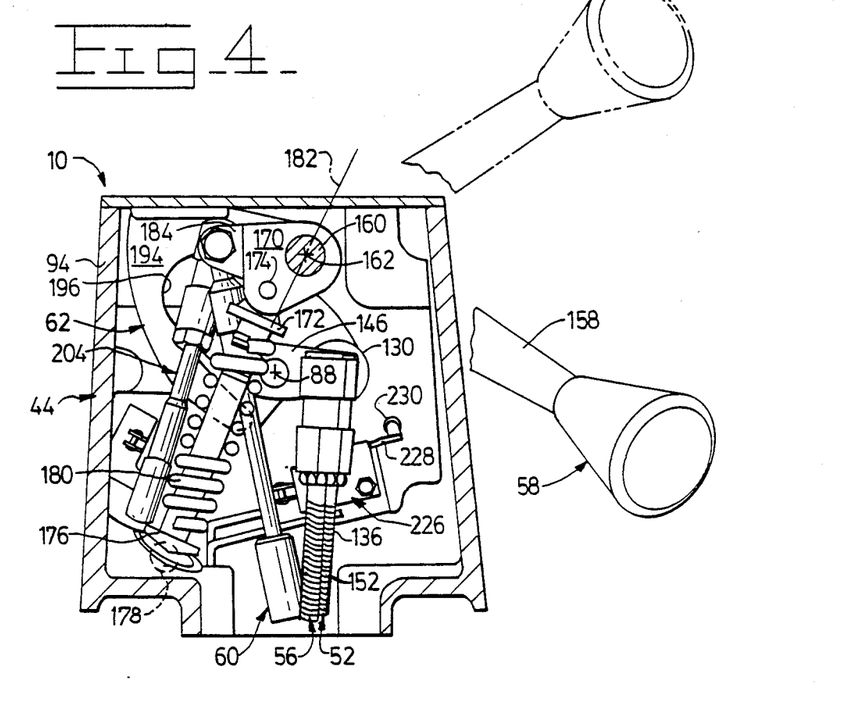
FIG. 4 is an enlarged, fragmentary, diagrammatic, cross sectional view as taken along line IV—IV of FIG. 3.
Figure 5:
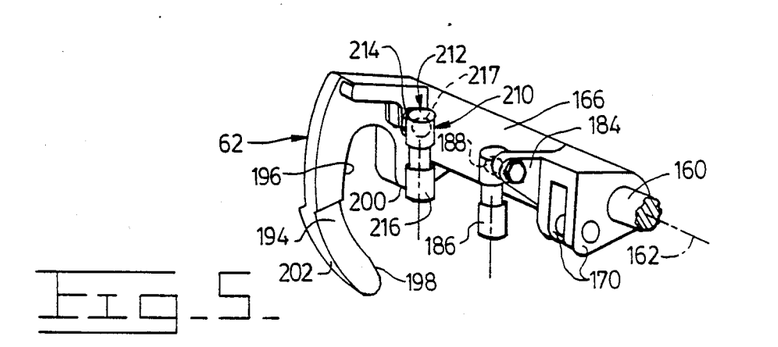
FIG. 5 a diagrammatic and oblique rear perspective view of one of the major elements of the indexing device of the present invention to better illustrate detail construction thereof.
Figure 6:
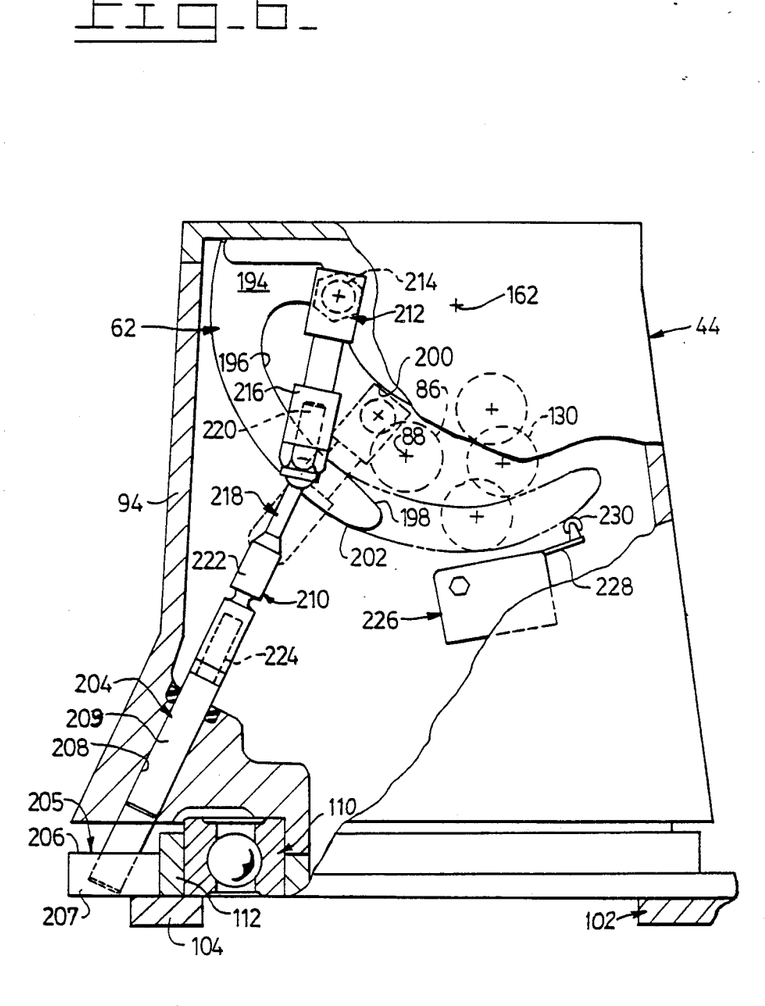
FIG. 6 a further enlarged, fragmentary, diagrammatic, side elevational view similar to FIG. 4, with many components of the control mechanism broken away to better show certain elements of the indexing device more clearly.

Attention is now directed to FIGS. 3, 4 and 6 and to the brake and transmission neutralizer device 58 which includes a parking brake actuating member or lever 158 movable between an elevationally lower BRAKE-OFF position and an elevationally raised BRAKE-ON position as is illustrated in solid lines and in phantom lines respectively. At the lower end thereof the lever 158 is releasably secured to a cylindrical shaft 160 which is mounted for limited rotation about an axis 162 substantially parallel to the axis 88 by a pair of needle bearings or sleeve bearings 164 seated within the upper profiled case 94. A tubular sleeve 166 is connected to rotate with the shaft 160 by a spline joint 168, and has the profiled neutralizing member 62 integrally secured thereto at the distal end as best shown in FIG. 5. At the proximal end a pair of lever arms or mounting ears 170 extend integrally therefrom. These ears are connected to an upper spring seat 172 by a pivot pin 174. A lower spring seat 176 is connected to the inner portion of the profiled case 94 by a ball and socket joint 178, and a coiled compression spring 180 extends between the two seats. The pivot pin 174 is located at the upper side of a plane 182 passing through the ball and socket joint 178 and the axis 162 when the lever 158 is in the lowered BRAKE-OFF position, and is located at the lower side of the plane 182 when the lever is in the raised BRAKE-ON position, thus providing a desirable over-center spring action to movement of the lever 158.

A lever arm 184 is also secured to the sleeve 166 intermediate the ends thereof as best shown in FIG. 5. An upper portion 186 of the brake push-pull rod assembly 60 is connected to this lever arm through an outstanding ball and socket joint 188. As illustrated in FIG. 3, a lower portion 190 of the rod assembly 60 depends through the central bore 116 and generally along the axis 48, and since the upper portion is slightly inclined with respect to the lower portion, another ball and socket joint 192 is used to connect them. As is diagrammatically indicated, the distal end of the lower portion 190 is connected to the parking brake selector spool 82, which can be arranged COncentrically along the central axis 48, if desired.

Referring to FIGS. 4 and 6, the profiled neutralizing member 62 defines a generally C-shaped cam plate or neutralizing lever 194 which is profiled to define an arcuate slot 196, a pair of contoured entry ramps 198 and 200 at the opposite open end of the slot, and a radially outwardly facing surface 202 at the distal end of the cam plate. The opposite ramps 198 and 200 cooperatively make contact with the cylindrical projection 130 of the directional actuating member 126 as will later be explained.

An indexing device 204 is cooperatively associated with the steering assembly 44 and the brake and transmission neutralizing device 58, and in conjunction therewith reference is made to FIGS. 1 and 6 showing the bearing retainer 112 which is releasably connected to the upper deck 104. The annular bearing retainer 112 has a forwardly disposed extension 205 having a horizontal upper surface 206 and defining therein an indexing pocket or radially outwardly opening slot 207 which is oriented substantially in the longitudinal plane 20 passing through the upstanding axis 48. Alternatively, such extension and indexing slot 207 could be defined in the frame 102 rather than in the bearing retainer. Referring to FIG. 6, the indexing device 204 also includes an upwardly extending, inclined bore 208 defined through the upper profiled case 94. An elongate cylindrical locking element 209 is adapted to reciprocate guidably within the bore 208, and coupling means or a connection apparatus 210 is provided to couple the locking element 209 to the sleeve 166 and thus to the brake actuating member 158 through the intermediate shaft 160. Preferably, the connection apparatus 210 includes an upper ball joint assembly 212 having an externally threaded ball stud 214 screwthreadably received in the cam plate 194 at a preselected radius from the axis 162 and oriented parallel to the axis. An internally threaded socket end 216 is universally connected to the ball stud in a depending manner. A lower ball joint assembly 218 has an externally threaded socket end 220 that extends generally upwardly and is screwthreadably received in the depending socket end 216. Also, the lower ball joint assembly has an internally threaded ball end 222 which is connected at its upper end for universal movement in the socket end 220, and at its lower end is screwthreadably connected to a externally threaded extension 224 of the locking element 208.

The indexing device 204 further includes a limit switch assembly or microswitch 226 suitably secured to the inner walls of the upper profiled case 94 as is shown in FIGS. 3, 4 and 6. The switch has an actuating arm 228 with a roller wheel 230 mounted at the distal end thereof, so that the depression of the roller wheel and the arm by the cam plate 194 would be effective to close the switch. This switch is conventional, such as is offered by Honeywell Inc. under Part No. V3L-111. A pair of electrical lines or wires 232 couple the switch to an engine starting circuit 234 as is diagrammatically shown in FIGS. 3 and 7.

INDUSTRIAL APPLICABILITY

Assuming the engine 22 is running, the directional actuating member 126 shown in FIG. 3 can be rotated in a clockwise direction when looking inwardly along the axis 88 to the FORWARD mode from the central NEUTRAL mode, whereupon the projection 130 is elevated. This raises the ball assembly 132, the socket head 134 and the cable 136 connected to the directional selector spool 74 and pulls it outwardly of the second hydraulic control valve 76. On the other hand, if the actuating member 126 is rotated in the counterclockwise direction to the REVERSE mode from NEUTRAL the projection 130 is lowered and the cable 136 is pushed to retract the directional selector spool 74.

The speed actuating member 142 is typically located in FIRST GEAR and may be rotated therefrom in even increments in a clockwise direction when looking inwardly along the axis 88 of FIG. 3 to the SECOND GEAR and THIRD GEAR positions. With such rotation of the speed actuating member the radius arm 146 illustrated in FIG. 4 is moved in a counterclockwise direction. This elevates the cable 152 and pulls the speed selector spool 78 outwardly of the third hydraulic control valve 80.

During straight longitudinal movement of the track-type vehicle 14, the tubular tiller arm 86 and the housing assembly 92 are positioned in NEUTRAL as is illustrated in FIG. 1. If, however, it is desired to steer the vehicle to the left when traveling forwardly, the tiller arm is urged forwardly or in a counterclockwise direction when viewing downwardly along the upstanding pivot axis 48. This causes the corresponding movement of the housing assembly 92 on the bearing assembly 110 as is shown in FIG. 3, and also the output lever arm 46 located at the bottom thereof. The counterclockwise movement of the output lever arm 46 pulls the steering selector spool 64 outwardly of the first hydraulic control valve 66 through suitable connection means therebetween. The steering motor 70 shown in FIG. 7 is then caused to operate in the desired direction and at the desired rate of speed such that the right output member 30 of the cross drive mechanism 26 is accelerated and the left output member 28 is decelerated approximately the same amount. The vehicle is subsequently caused to rotate in a counterclockwise direction about its own axis 72 and to turn to the left. Of course, the clockwise movement of the tiller arm will urge the steering selector spool 64 inwardly to cause clockwise rotation of the vehicle and a right turn when traveling forwardly. When the direction of longitudinal travel of the vehicle 14 is changed to REVERSE, the forward displacement of the tiller arm 86 will still cause counterclockwise rotation of the vehicle about its own axis 72.

Referring now to the brake and transmission neutralizer device 58 and the indexing device 204 shown in FIGS. 4 and 6, it can be appreciated that the indexing device 204 prevents movement of the parking brake actuating lever 158 to the BRAKE-ON position when the steering assembly 44 and/or housing assembly 92 is not precisely positioned rotationally in the NEUTRAL steering mode shown in FIG. 1. Specifically, when the operator attempts to move the brake actuating lever 158 upwardly and to thereby depress the connection apparatus 210, the lower end of the locking element 209 is unable to project into the relatively narrow slot 207 formed in the extension 205 of the bearing retainer 112 because the inclined bore 208 is angularly misaligned therefrom. Such restricted movement will immediately be recognized by the operator because the lower end of the locking element 209 will contact the upper surface 206, whereupon the tiller arm can be swung to the true NEUTRAL steering mode and the locking element 209 allowed to depend fully into the slot 207 as is shown in phantom lines in FIG. 6. The sleeve 166 shown in FIG. 5 is thereby allowed to rotate about the axis 162 in a direction to lower the lever arm 184, and in doing this the pivot pin 174 shown in FIG. 4 is moved in an arc from the upper side of the plane 182 to the lower side of that plane. The compression spring 180 is gradually compressed until the pivot pin passes by that plane, and thereafter the spring expands and positively urges the lever toward the BRAKE-ON position with a desirable over-center snap action. The third push-pull rod assembly 60 is forced downwardly and the parking brake selector spool 82 is pushed into the fourth hydraulic control valve 84 to simultaneously engage the left and right parking brakes 40 and 42 of the vehicle as shown in FIG. 7.

When the parking brake actuating lever 158 is elevated to the BRAKE-ON position, the profiled cam plate 194 is also caused to move in a counterclockwise direction when viewing Figs. 4–6. In the event that the operator had positioned the directional actuating member 126 in FORWARD wherein the cylindrical projection 130 is arcuately disposed in an elevated position, the cam plate 194 would contact the projection and urge it downwardly. Specifically, the radially inner entry ramp 200 would initially force the projection 130 downwardly. In an opposite manner, if the operator had positioned the directional actuating member 126 in REVERSE the projection would be in a lowered position. The subsequent counterclockwise movement of the cam plate 194 would cause the radially outer ramp 198 to urge the projection upwardly. The arcuate slot 196 allows the cam plate to avoid contact with the tubular tiller arm 86 until the desired amount of travel is obtained for movement of the third push-pull rod assembly 60.

As another aspect of the indexing device 204, the movement of the brake actuating member 158 from the BRAKE-OFF position to the BRAKE-ON position will cause the cam plate 194 to travel in a counterclockwise direction when comparing the solid line and phantom line positions thereof in FIG.6. Accordingly, the lower surface 202 thereof will make rolling contact with the roller wheel 230 of the microswitch 226 and will depress the arm 228 and close the microswitch. As can be appreciated by reference to FIGS. 3 and 7, the two lines 232 are serially connected electrically when the microswitch is closed. Then, if the engine 22 is shut off for a period of time the closed microswitch will allow restarting of the engine with it being assured that the steering assembly 44 is positively in NEUTRAL as previously described. In the event the engine is shut down with the steering assembly angularly positioned away from NEUTRAL in an active steering mode, it would be impossible to restart the engine under such circumstances. This is because the locking element 209 shown in FIG. 6 would not be aligned with the indexing slot 207, and the cam plate 194 could not be rotated to a position of depressing the contact arm 228 of the microswitch 226, and the lines 232 would be electrically uncoupled to prevent such restart.

In view of the foregoing, it can be appreciated that the movement of the brake actuating lever 158 from the BRAKE-OFF to the BRAKE-ON position provides the following functions:

(1) assures that the steering assembly 44 and/or the tiller arm 86 is initially positively indexed to the centered NEUTRAL steering mode;

(2) applies the parking brakes 40 and 42;

(3) positions the directional actuating member 126 and the second hydraulic control valve 76 to NEUTRAL in the event that the directional actuating member is initially in FORWARD or REVERSE; and (4) allows the engine 22 to be restarted after a shut down.

Of course, such movement of the brake actuating lever 158 is contingent on the proper indexing of the locking element 209 with the slot 207, for without the proper angular alignment of the steering assembly 44 into NEUTRAL the brake actuating lever could not be positioned to the BRAKE-ON mode and, independently, the engine 22 could not be restarted because the microswitch 226 would be electrically opened. The indexing device 204 is thus positive and reliable in operation, and relatively simple and economical in construction.

Other aspects, objects and advantages will become apparent from a study of the specification, the drawings and appended claims.

We claim:

1. An indexing device for a vehicle having a frame, brake means for inhibiting movement of the vehicle in a BRAKE-ON position, and a control mechanism including a steering assembly and support means for mounting the steering assembly on the frame for swinging movement about an upstanding axis in either direction away from a central NEUTRAL position, comprising:
   a brake actuating member mounted on the steering assembly and being moveable thereon between first and second positions;
   an elongate locking element movably connected to the steering assembly;
   the control mechanism including means for positioning the brake means into the BRAKE-ON position when the brake actuating member is moved from the first position to the second position; and
   coupling means for moving the locking element into interlocking engagement with the frame in response to movement of the brake actuating member from the first position to the second position solely when the steering assembly is located in the NEUTRAL position.

2. The indexing device of claim 1 wherein the brake actuating member is limitedly rotatable on the steering assembly about a pivot axis.

3. The indexing device of claim 2 wherein the steering assembly defines a guiding bore, the frame defines a pocket, and the locking element is disposed in the bore for movement into engagement with the pocket by the coupling means.

4. The indexing device of claim 1 including an engine starting circuit and an electrical switch assembly connected to the steering assembly and electrically coupled to the engine starting circuit, the control mechanism including means for closing the switch assembly in response to movement of the brake actuating member to the second position and permitting restarting of the engine starting circuit.

5. An indexing device for holding a steering assembly in a NEUTRAL position on a vehicle having a brake, a frame, and support means for mounting the steering assembly on the frame for swinging movement about an upstanding axis, and a brake actuating member mounted on the steering assembly and being limitedly rotatable thereon about a pivot axis between a BRAKE-OFF position and a BRAKE-ON position, comprising:
   the frame defining an indexing pocket;
   an elongate locking element movably mounted on the steering assembly; and
   coupling means for inserting the locking element positively into the pocket in response to movement of the brake actuating member to the BRAKE-ON position when the steering assembly is angularly positioned in the NEUTRAL position.

6. The indexing device of claim 5 including an engine starting circuit, and an electrical switch, and means mounted on the steering assembly for operating the electrical switch when the brake actuating member is in the BRAKE-ON position and allowing activation of the engine starting circuit thereat.

7. An indexing device for a vehicle having a frame, and a control mechanism including a steering assembly and support means for mounting the steering assembly on the frame for swinging movement about an upstanding axis in either direction away from a central NEUTRAL position, comprising:
   brake means for inhibiting movement of the vehicle including a brake actuating member mounted on the steering assembly and being moveable thereon between a BRAKE-OFF position and a BRAKE-ON position; and
   means for locking the steering assembly to the frame in response to movement of the brake actuating member from the BRAKE-OFF to the BRAKE-ON position solely when the steering assembly is located in the NEUTRAL position.

8. The indexing device of claim 7 wherein the brake actuating member is limitedly rotatable on the steering assembly about a pivot axis, and the means for locking the steering assembly to the frame includes an elongate locking element connected to the steering assembly.

* * * * *